United States Patent [19]
Rivera

[11] Patent Number: 5,327,677
[45] Date of Patent: Jul. 12, 1994

[54] PLANT WATERING DEVICE

[76] Inventor: Efrain Rivera, 22 Lorraine Ter., Boonton, N.J. 07005

[21] Appl. No.: 957,104

[22] Filed: Oct. 7, 1992

[51] Int. Cl.$^5$ .............................................. A47G 7/02
[52] U.S. Cl. ..................................................... 47/40.5
[58] Field of Search ......................................... 47/40.5

[56] References Cited

U.S. PATENT DOCUMENTS

| | | |
|---|---|---|
| 2,938,304 | 5/1960 | Thomas et al. |
| 3,137,969 | 6/1964 | Sokol ................................... 47/40.5 |
| 3,562,951 | 2/1971 | Schwaderlapp ...................... 47/40.5 |
| 3,697,026 | 10/1972 | Hambrick . |
| 3,784,136 | 1/1974 | Lopez .................................. 47/40.5 |
| 4,034,505 | 7/1977 | Lydall ................................. 47/40.5 |
| 4,653,224 | 3/1987 | Weckesser . |
| 4,825,587 | 5/1989 | Stancil . |
| 4,930,252 | 6/1990 | Krause et al. . |
| 5,009,028 | 4/1991 | Lorenzana et al. . |
| 5,076,009 | 12/1991 | Cibor . |
| 5,090,443 | 2/1992 | Jacobsen . |
| 5,111,611 | 5/1992 | Elder . |
| 5,157,868 | 10/1992 | Munoz ................................ 47/40.5 |

Primary Examiner—Ramon S. Britts
Assistant Examiner—Joanne C. Downs
Attorney, Agent, or Firm—Thomas L. Adams

[57] ABSTRACT

A watering device for a tree stand has a reservoir with an upper opening. A cover having a port is mounted on the upper opening of the reservoir. The cover encloses closes the reservoir. A shelf is mounted in the reservoir below the cover and is shaped to allow water to bypass the shelf. A length of tube communicating with the reservoir supplies water to the reservoir below the shelf. A valve is reciprocatively mounted between the shelf and the cover for controlling water flow through the port. A float is attached atop the valve means and above the cover for floating and operating the valve means to seal the port of the cover. Thus, water flowing out of the reservoir and into the tree stand is regulated by the floating and the operation of the valve.

15 Claims, 3 Drawing Sheets

PLANT WATERING DEVICE

BACKGROUND OF THE INVENTION

Field of the Invention

The present invention relates to a watering device for a stand, and in particular, to a float operated valve means for regulating water flow.

Description of Related Art

Plants kept indoors become not only unattractive, but increasingly flammable unless kept in water. Therefore, a tree kept indoors, such as a Christmas tree, should be placed in a stand with an adequate water level to reduce the potential fire hazard.

A problem with many existing plant stands is the inconvenience of refilling the stands with water, since they are usually located on the floor. Therefore, a watering device ought to be easily accessible and easily supplied with water without stooping.

Some known watering devices employ a float means to regulate water entering the plant stand. A basic problem with these devices is that a rapid inrush of water closes the regulating valve to prematurely stop the water flow.

Known devices allow water to enter a tree stand until a predetermined level is achieved. U.S. Pat. No. 5,076,009 shows a Christmas tree watering system in which a reservoir mounted in a tree stand contains a float valve assembly. The internal float element is slidably mounted to open and close an inlet port and maintain the water level in the tree stand. The internal float is disadvantageous because it restricts water flow and can jam if tilted.

U.S. Pat. No. 5,111,611 shows a tree holder with a float-regulated reservoir for automatically delivering water. A pivotal float mounted in the reservoir controls a valve to regulate the water level in the reservoir and stand. This complicated design contains a swinging valve actuator that is unnecessarily expensive for the application.

U.S. Pat. No. 5,090,443 shows another internal float valve in which water entering a float chamber lifts the float and bends a water supply tube. The bending of the tube does not create a very tight seal and water may continue to seep and spill over the tree stand onto the floor.

U.S. Pat. Nos. 4,825,587 and 4,930,252 show complicated devices employing float-operated electrical switches that regulate the water level in a tree stand.

Other patents, not analyzed in detail herein, include: U.S. Pat. Nos. 3,137,969; 3,697,026; 2,938,304; 4,653,224; and 5,009,028. None of these patents disclose a relevant float means and therefore do not describe the unique features and combination of structure of the device described herein.

SUMMARY OF THE INVENTION

It is an object of this invention to provide a watering device that controls the flow of water into a stand.

It is a further object of this invention to provide a watering device with a reliable external float that is unlikely to jam.

An additional object of this invention is to provide a watering device that is reliable, efficient and easy to manufacture.

In accordance with the illustrative embodiments demonstrating features and advantages of the present invention, there is provided a watering device for a stand. The device has reservoir with an upper opening, and a cover having a port and mounted on and enclosing said upper opening of the reservoir. The shelf is mounted in the reservoir below the cover and is shaped to allow water to bypass the shelf. A length of tube communicates with the reservoir to supply water to the reservoir below the shelf. Also included is a valve which is reciprocatively mounted between the shelf and the cover for controlling water flow through the port. The device also has a float attached atop the valve and above the cover for floating and operating the valve to seal the port of the cover. Thus the water flowing out of the reservoir and into the plant stand is regulated by the floating and the operation of the valve.

By employing a device of the foregoing type, an improved watering device is achieved. In a preferred embodiment, the cover and the helf have inlets that are aligned, so they can receive a length of feeder tube. In addition, the shelf has relieved corners that are spaced from the corners of the reservoir, to provide an even and controlled inflow of water around the shelf. Therefore, an inrush of water does not drive the valve means closed and hold it closed.

The shelf has a circular depression for cradling the valve. The valve extends up through a concave port in the cover to connect to a float. When water lifts the float, the attached valve seats into the concave port to prevent further water flow.

Preferably, the underside of the reservoir has a layer of adhesive foam for attachment inside a tree stand. In an alternate embodiment, the base of the reservoir is slanted to compensate for the curve inside a tree stand.

BRIEF DESCRIPTION OF THE DRAWINGS

The above description, as well as other objects, features and advantages of the present invention will be more fully appreciated by reference to the following detailed description of presently preferred, but nonetheless illustrative embodiments, in accordance with the present invention taken in conjunction with the accompanying drawings, wherein.

DETAILED DESCRIPTION OF THE PREFERRED EMBODIMENTS

Figures 1, 2:
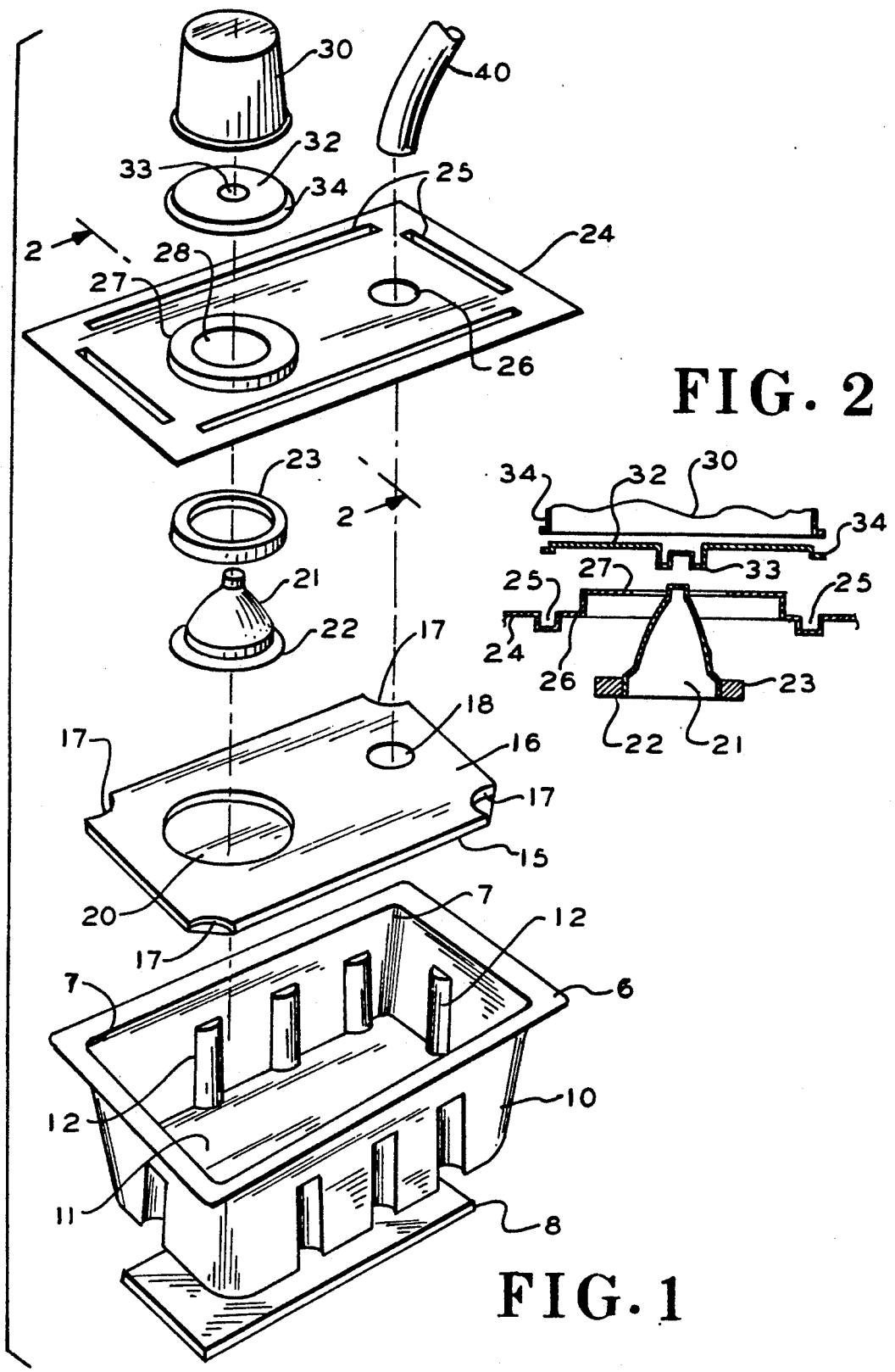
FIG. 1 is an exploded, axonometric view of a watering device according to the principles of the present invention.
FIG. 2 is a sectional view of the cover and adjacent components taken along line 2—2 of FIG. 1.
Figure 3A:
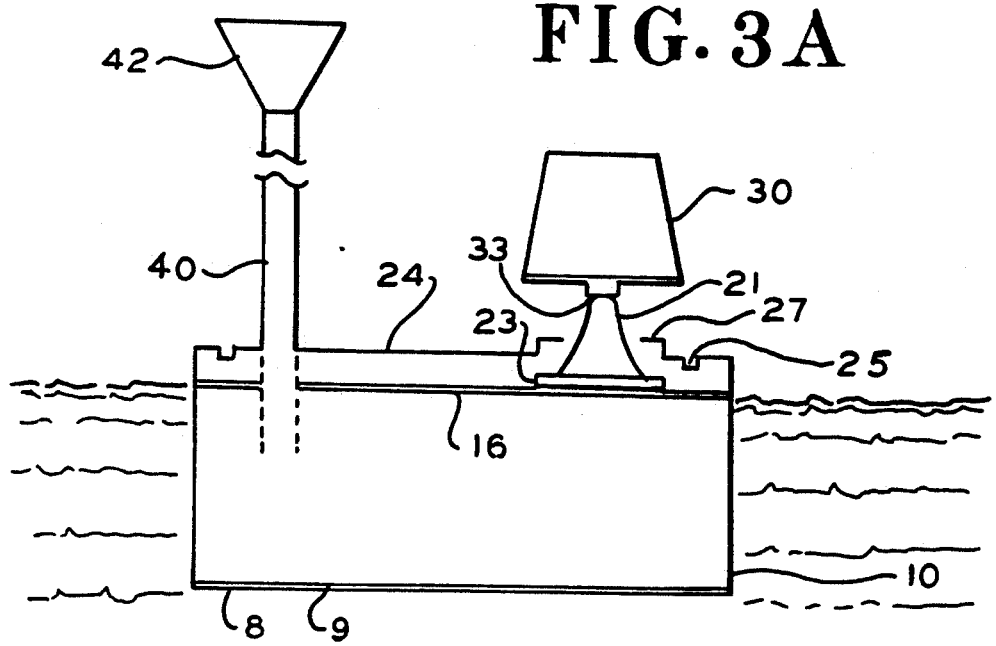
FIG. 3A is a schematic, side view of the watering device of FIG. 1 before the valve closes.
Figure 3B:
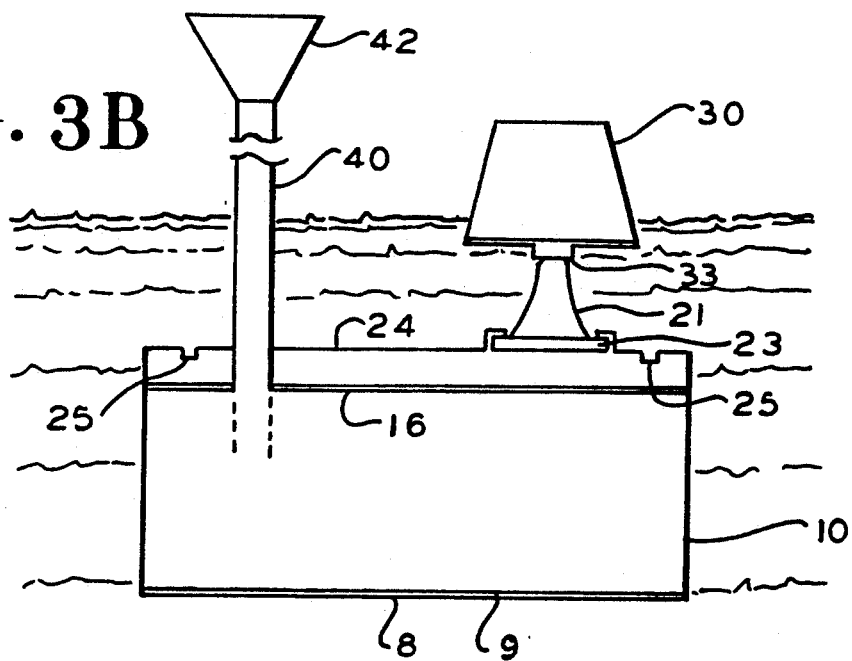
FIG. 3B is a schematic, side view of the tree watering device of FIG. 1 after the valve closes.
Figure 4:
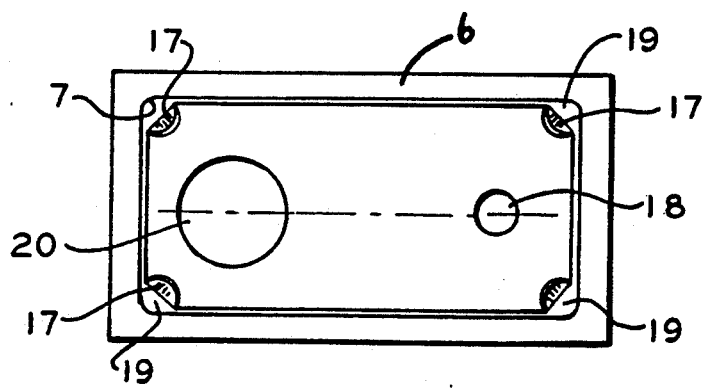
FIG. 4 is a top view of the shelf and reservoir of FIG. 1, with the cover and valve removed.

Referring to FIGS. 1–4, a watering device has a reservoir 10 and upper opening 11. Flange 6 extends around the perimeter of upper opening 11. Preferably, the reservoir is generally shaped as a rectangular prism with rounded corners 7, although, other shapes are possible, such as cylindrical or frustro-conical.

The preferred composition of reservoir 10 is vacuum-formed polyvinyl chloride, however, it can be made of other materials such as low density polyethylene, polypropylene, glass, ceramic, etc. The preferred dimensions of reservoir 10 are approximately 1¼ inches wide, 2⅝ inches long (both along the top, excluding the flange) and 1 inch high.

Reservoir 10 has a number of columnar indentations 12 extending inwardly from the reservoir sides. In the preferred embodiment, the two opposing, longer sides each have three indentations 12 and the other two opposing sides each have one indentation 12. Indentations 12 extend up from base 9 of reservoir 10 about ⅝ of an inch. Indentations 12 are tapered semicylinders (i.e., frustro-conical) and converge toward upper opening 11, although they can be other shapes such as rectangular prisms.

In the preferred embodiment, a layer of adhesive foam 8 is attached to the underside 9 of reservoir 10 to secure it to the plant stand. However, the reservoir can be attached to the stand by other means such as gluing or screwing underside 9 of reservoir 10 to the stand. Alternatively, the reservoir can be strapped to the trunk of a tree that is being watered by the reservoir. These straps can be self locking bands having a pointed tip and locking lugs that are threaded through a unidirectional, locking collar on one end of the band.

Cover 24 has a port 28 and is mounted atop flange 6 of reservoir 10 by gluing, clipping, taping or otherwise. In a preferred embodiment, cover 24 has a first inlet 26 for tightly receiving a length of tube 40. The preferred diameter of inlet 26 is about ⅜ inch. Additionally, cover 24 has a hollow cylindrical protrusion 27 with a coaxial port 28, which is shaped to receive washer 23 as will be described below. Port 28 is preferably a circular hole with a diameter of about ½ inch.

Cover 24 is preferably rectangular in plan to match the shape of upper opening 11 of reservoir 10, although, it can be other shapes such as cylindrical or polygonal. Cover 24 is preferably made of low density polyethylene, but can be made of one of a variety of different materials such as high density polyethylene, polypropylene, polyvinyl chloride, etc. The preferred dimensions of cover 24 are 1.5 inches wide and 2.75 inches long.

Cover 24 also has four, hollow, inverted ridges 25, which center cover 24 on reservoir 10. Preferably, each ridge borders one of the edges of cover 24, so that cover 24 is secured in reservoir 10. Ridges 25 extend inside and below flange 6 and surround port 28 and inlet 26.

Shelf 16 is mounted in reservoir 10 below cover 24 on the semicircular plateaus atop indentations 12. Shelf 16 has a skirt 15 depending from its edges. The corners 17 of shelf 16 have semicircular notches skirted with a quarter-cylindrical wall atop a chordal floor (having, for example, a ¼ inch radius). A semicircular gap 19 (FIG. 4) between rounded inside corners 7 of reservoir 10 and notched corners 17 of shelf 16 throttles the water flow around shelf 16 so that the float valve (described further hereinafter) is not driven by an inrush of water.

Shelf 16 has a circular depression 20 for cradling the valve means, described hereinafter. Shelf 16 also has a second inlet 18 for tightly receiving tube 40. Second inlet 18 is aligned with first inlet 26 in cover 24 to allow tube 40 to fit tightly in both inlets. The preferred diameter of inlet 18 is ⅜ of an inch.

Preferably, shelf 16 is made of vacuum-formed polyvinyl chloride, although it can be made of a variety of different materials such as high or low density polyethylene. Shelf 16 is preferably 2⅝ inches long and 1⅝ inches wide.

Tube 40 preferably has a ⅜ inch outside diameter and fits tightly in inlet 26 in cover 24 and inlet 18 in shelf 16. Tube 40 is preferably made of synthetic rubber or latex and is flexible enough to be draped on plant branches. Alternatively, tube 40 can be made of other materials such as polyethylene, polyvinyl chloride, or polypropylene. Tube 40 can come in a variety of lengths depending on the size of the plant or tree watered.

Funnel 42 is attached to the remote end of tube 40. Funnel 42 may be stored between branches on the tree or plant, or on a table top or other elevated surface. When used, funnel 42 is positioned high enough to allow the user to pour water into funnel 42 without stooping.

A valve means 21 is mounted in port 28 to reciprocate between shelf 16 and cover 24 for controlling water flow through port 28 as will be described below. The disclosed valve 21 is vacuum-formed and bell-shaped with a lower flange and an upper, closed, cylindrical stub, although other shapes are possible. Circular flange 22 extends around the bottom of valve means 21 with an outer diameter matching the inside diameter of depression 20 in shelf 16. Valve means 21 is freely and reciprocatively mounted between shelf 16 and cover 24. Valve means 21 is preferably made of high density polyethylene, although it can be made of polypropylene, polyvinyl chloride, low density polyethylene, etc.

Additionally, washer 23 is mounted around valve means 21 atop circular flange and is sized to fit snugly into protrusion 27. Preferably, the outer diameter of washer 23 is ⅜ inch and the inside diameter is ¼ inch. Washer 23 is made of silicone, or other suitable materials.

Base 32 is shown as a circular disk with a flange 34 and a cup 33 depending from its center. Cup 33 is sized to tightly receive the tip of valve means 21. The preferred base 32 is vacuum-formed from high density polyethylene, or other materials such as polypropylene, polyvinyl chloride or low density polyethylene.

Float 30 is an inverted cylindrical cup with a closed top and open bottom. The bottom of float 30 is mounted on flange 34 around base 32 by R.F. sealing, or otherwise. Float 30 is externally located above cover 24. Therefore jamming is unlikely, but if it occurs can easily be rectified. Float 30 is preferably a tapered cylinder but other shapes are possible including cubes, spheres, etc. Float 30 is preferably made of light-spheres, weight material such as polyvinyl chloride in order to create a strong buoyant force when floating on water. The preferred height of float 30 is one inch.

Figure 6:
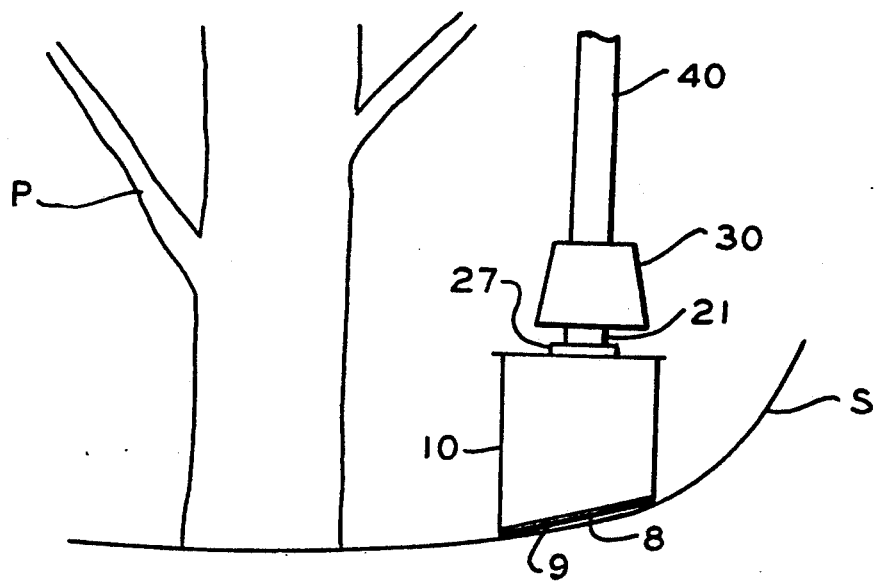
FIG. 6 is a schematic, side view of an alternate embodiment showing the reservoir with an inclined base and mounted inside a tree stand.

FIG. 6 shows an alternate embodiment where underside 9 of reservoir 10 is angled upward. The preferred angle of inclination of underside 9 of reservoir 10 is 13 degrees. Layer of adhesive foam 8 ensures that the plant watering device will remain in place on stand S. This embodiment is advantageous when using a curved tree stand S. In this alternate embodiment, one of the longer sides of reservoir 10 is positioned closer to tree P in stand S. Underside 9 of reservoir 10 angles up to the opposing longer side. Therefore, valve means 21 can remain vertical when reservoir 10 is mounted on curved stand S. It is important for valve means 21 to operate vertically in order for float 30 to raise washer 23, mounted around valve means 21, into seat 27, so that water inflow will cease once an appropriate level has entered stand S.

Figure 5:
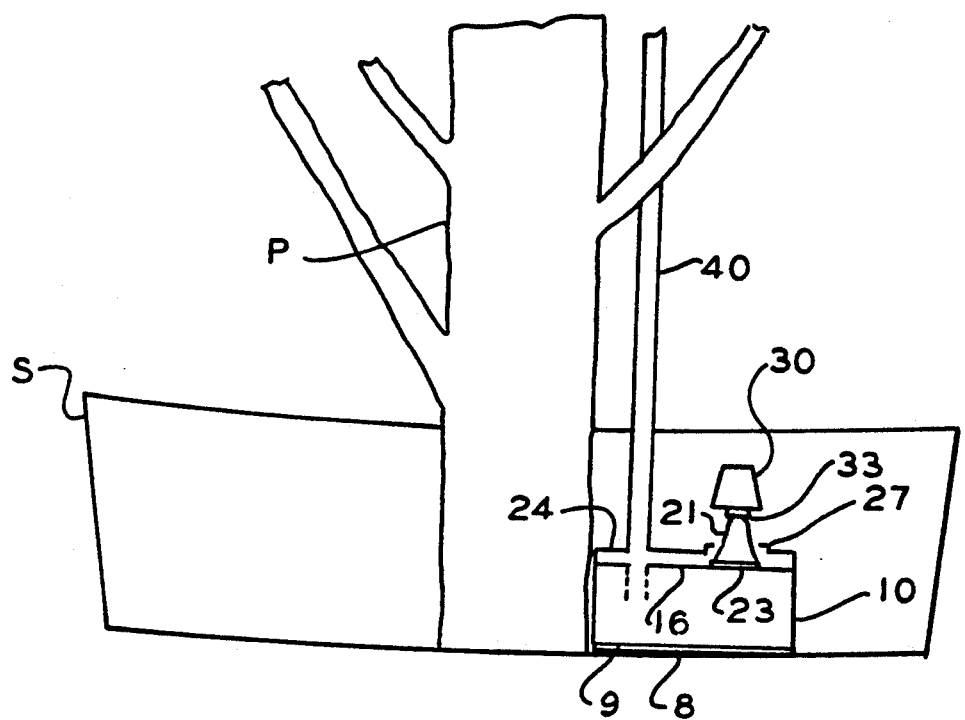
FIG. 5 is a schematic, side view of the watering device of FIG. 1 mounted in a plant stand.

To facilitate an understanding of the principles associated with the foregoing device, its operation will now be briefly described. The tree watering device may be placed on a flat portion of a Christmas tree stand S in the condition shown in FIG. 5. The device is preferably positioned next to the base of the tree and away from any branches that might interfere with the operation of the float. If the device is to be used in a curved plant stand, the plant watering device disclosed in the alternate embodiment should be utilized (see FIG. 6). Adhesive foam layer 8 secures the device to the bottom of the stand S.

Tube 40 is inserted through first inlet 26 of cover 24 and through second inlet 18 of shelf 16 into reservoir 10. Funnel 42 (see FIG. 3A) is attached to the remote end of tube 40 and may be stored between the branches. The user pours water from a container into funnel 42 keeping the water level below the top of funnel 42. Water flows down tube 40 through cover 24 and shelf 16 into reservoir 10. As the water level in the reservoir increases, water flows through spaces 19 located between notched corners 17 in shelf 16 and rounded corners 7 of reservoir 10. Water then flows to the top of shelf 16 and encounters valve means 21 which is cradled in depression 20.

Shelf 16 allows for an even and controlled inflow of water into the plant watering device, since water entering reservoir 10 is not free to splash off underside 9 and rush up the reservoir sides to port 28, thereby driving float 30 and attached valve means 21 against port 28 prematurely. Instead, inflowing water must travel gradually up through gaps 19 in a controlled manner through port 28 past valve means 21.

As the water level in the stand S continues to rise, water surrounds base 32 fully and float 30 partially. The water causes float 30 to float upward and lift the attached valve means 21. As valve means 21 rises, washer 23 mounted around valve means 21 moves into seat 27 (see FIG. 3B). Therefore, washer 23 and valve means 21 seals aperture 28 when raised by float 20, thereby preventing further inflow of water into the plant stand.

Excess water in funnel 42 may then be removed by tilting the funnel and returning the unneeded water into an appropriate container (not shown). Funnel 42 may then be stored among the tree branches.

Alternately, excess water can be left in funnel 42. When the water in the plant stand falls below float 30, float 30 will move down toward reservoir 10. The attached valve means 21 will correspondingly move downward and aperture 28 will be unsealed. Water remaining in funnel 42 will automatically flow down tube 40 into reservoir 10 to replenish the water supply to the stand. When all the water in funnel 42 has been used, the funnel may be refilled with water by the user.

Obviously, many modifications and variations of the present invention are possible in light of the above teachings. It is therefore to be understood that within the scope of the appended claims, the invention may be practiced otherwise than as specifically described.

I claim:

1. A watering device for a stand comprising:
   a reservoir having
   a cover having a port and mounted on and enclosing said upper opening of said reservoir;
   a shelf mounted in said reservoir below said cover and shaped to allow water to bypass said shelf;
   a length of tube communicating with said reservoir for supplying water to said reservoir below said shelf;
   a valve means reciprocatively mounted between said shelf and said cover for controlling water flow through said port; and
   a float attached atop said valve means and above said cover, for floating and operating said valve means to seal said port of said cover, so that water flowing out of said reservoir and into the stand is regulated by the floating and operation of the valve means.

2. The watering device of claim 1 wherein at least one gap exists between said reservoir and said shelf for throttling water flow around said shelf.

3. The watering device of claim 2 wherein said valve means extends through said port of said cover.

4. The watering device of claim 3 wherein said reservoir has a plurality of inside corners and said shelf has a plurality of relieved corners spaced from said inside corners of said reservoir for providing an even and controlled flow of water past said shelf.

5. The watering device of claim 4 wherein said cover further has a first inlet and said shelf has a second inlet, said first inlet being aligned above said second inlet for receiving said length of tube.

6. The watering device of claim 5 wherein said shelf has a circular depression for cradling said valve means.

7. The watering device of claim 6 further comprising a washer mounted on said valve means.

8. The watering device of claim 7 wherein said cover has a protrusion, said port being located in said protrusion said protrusion being shaped to seat said washer when said float raises said valve means up to said port.

9. The watering device of claim 8 wherein said reservoir has a plurality of upstanding sides, said sides having columnar indentations projecting therefrom inside said reservoir.

10. The watering device of claim 9 wherein said shelf is mounted atop said columnar indentations.

11. The watering device of claim 10 wherein said cover has a plurality of dependent ridges for centering said cover on said upper opening of said reservoir.

12. The watering device of claim 11 wherein said float has a base with a cup attached to said valve means.

13. The watering device of claim 12, further comprising a layer of adhesive foam attached underneath said reservoir for securing it to said stand.

14. The watering device of claim 8, wherein said base is slanted to compensate said reservoir for curving inside said stand.

15. A watering device for a tree stand comprising:
   a reservoir having an upper opening, a base and a plurality of inside corners;
   an adhesive layer of foam attached underneath said base of said reservoir for securing it to a tree stand;
   a cover having a plurality of dependent ridges for securing said cover in said upper opening of reservoir, said cover further having a port and a first inlet;
   a shelf mounted in said reservoir and having a plurality of notched corners spaced from said inside corners of said reservoir for providing an even and controlled inflow of water, said shelf further having a second inlet;
   a length of tube communicating with said reservoir for supplying water to said reservoir below said shelf, said tube being mounted through said first inlet of said cover and said second inlet of said shelf;

a valve means reciprocatively mounted between said shelf and said cover and extending through said port of said cover for controlling water flow through said port; and a float attached atop said valve means above said cover, for floating and operating said valve means to seal said port of said cover.

* * * * *